United States Patent
Lu et al.

(10) Patent No.: US 12,510,212 B2
(45) Date of Patent: Dec. 30, 2025

(54) LIGHTING DEVICE HAVING GROUPS OF WHITE AND CYAN LED CHIP

(71) Applicant: SIGNIFY HOLDING B.V., Eindhoven (NL)

(72) Inventors: Jun Lu, Shanghai (CN); Hang Li, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/688,157

(22) PCT Filed: Aug. 25, 2022

(86) PCT No.: PCT/EP2022/073671
§ 371 (c)(1),
(2) Date: Feb. 29, 2024

(87) PCT Pub. No.: WO2023/031011
PCT Pub. Date: Mar. 9, 2023

(65) Prior Publication Data
US 2024/0401781 A1 Dec. 5, 2024

(30) Foreign Application Priority Data

Aug. 30, 2021 (WO) ................ PCT/CN2021/115438
Sep. 24, 2021 (EP) ..................................... 21198866

(51) Int. Cl.
*F21K 9/00* (2016.01)
*F21V 5/00* (2018.01)
(Continued)

(52) U.S. Cl.
CPC ................ *F21K 9/00* (2013.01); *F21V 5/007* (2013.01); *F21V 7/0083* (2013.01); *F21V 7/041* (2013.01);
(Continued)

(58) Field of Classification Search
CPC .......... F21K 9/00; F21V 5/007; F21V 7/0083; F21V 7/041; F21Y 2105/12; F21Y 2113/13; F21Y 2115/10
See application file for complete search history.

(56) References Cited

U.S. PATENT DOCUMENTS 4,254,453 A * 3/1981 Mouyard ................ G09F 13/22
345/82
5,420,482 A * 5/1995 Phares ................. H05B 47/155
315/300
(Continued)

FOREIGN PATENT DOCUMENTS

EP 2397749 A2 12/2011
EP 2397749 A3 5/2015
(Continued)

*Primary Examiner* — Ismael Negron

(57) ABSTRACT

A lighting device includes multiple modules each having an array of LED chip connection pads, provided in groups, each group having a set of connection pads connected in parallel, with the groups being in series with each other. An optical unit is provided for shaping the light output from LED chips mounted on the pads. The groups are defined to minimize an overall spacing of the pads within the groups to mix light from the LEDs mounted on the connection pads.

10 Claims, 5 Drawing Sheets

(51) Int. Cl.
*F21V 7/00* (2006.01)
*F21V 7/04* (2006.01)
*F21V 19/00* (2006.01)
*F21Y 105/12* (2016.01)
*F21Y 113/13* (2016.01)
*F21Y 115/10* (2016.01)

(52) U.S. Cl.
CPC ....... F21V 19/0025 (2013.01); *F21Y 2105/12* (2016.08); *F21Y 2113/13* (2016.08); *F21Y 2115/10* (2016.08)

(56) References Cited

U.S. PATENT DOCUMENTS

| | | | | |
|---|---|---|---|---|
| 5,490,049 | A * | 2/1996 | Montalan | F21S 43/26241 362/240 |
| 5,819,454 | A * | 10/1998 | Rosenitsch | G09F 9/33 362/240 |
| 6,777,891 | B2 * | 8/2004 | Lys | H05B 47/1985 315/291 |
| 7,220,020 | B2 * | 5/2007 | Tsuei | F21K 9/00 362/240 |
| 7,465,056 | B2 * | 12/2008 | Peng | H05B 45/20 362/85 |
| 7,740,371 | B1 * | 6/2010 | Lebens | H05B 45/10 362/802 |
| 8,267,543 | B2 * | 9/2012 | Park | F21K 9/62 362/241 |
| 9,322,528 | B2 * | 4/2016 | Scarlata | F21V 7/0083 |
| 9,793,247 | B2 * | 10/2017 | Yuan | H05B 45/40 |
| 10,234,112 | B2 * | 3/2019 | Min | F21V 19/002 |
| 10,842,016 | B2 * | 11/2020 | Bhat | H05K 1/0209 |
| 10,876,712 | B2 * | 12/2020 | Booij | F21V 7/04 |
| 11,191,220 | B2 * | 12/2021 | Adams | A01G 9/20 |
| 11,835,219 | B2 * | 12/2023 | Rasmussen | G02B 6/005 |
| 11,879,635 | B2 * | 1/2024 | Vilem | F21V 5/007 |
| 2004/0062040 | A1 * | 4/2004 | Blume | G02B 27/0101 362/293 |
| 2005/0138852 | A1 * | 6/2005 | Yamauchi | F21V 17/04 257/E33.071 |
| 2008/0101069 | A1 * | 5/2008 | Chang | G02F 1/133608 362/240 |
| 2012/0299801 | A1 * | 11/2012 | Kitano | F21K 9/00 362/249.02 |
| 2018/0213623 | A1 * | 7/2018 | Harada | H05B 45/20 |
| 2018/0259166 | A1 * | 9/2018 | Min | H05K 1/181 |
| 2024/0401781 | A1 * | 12/2024 | Lu | F21V 7/0083 |

FOREIGN PATENT DOCUMENTS

WO 2012005771 A2 1/2012
WO 2012005771 A3 6/2012

* cited by examiner

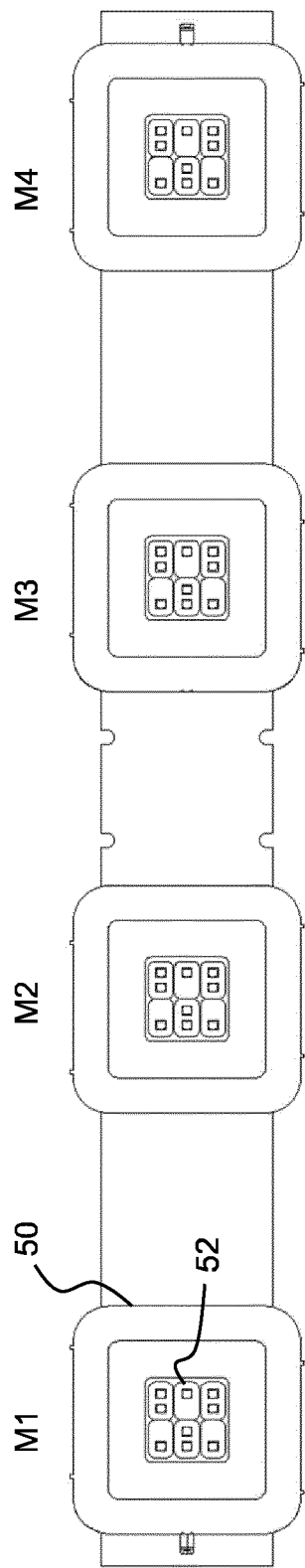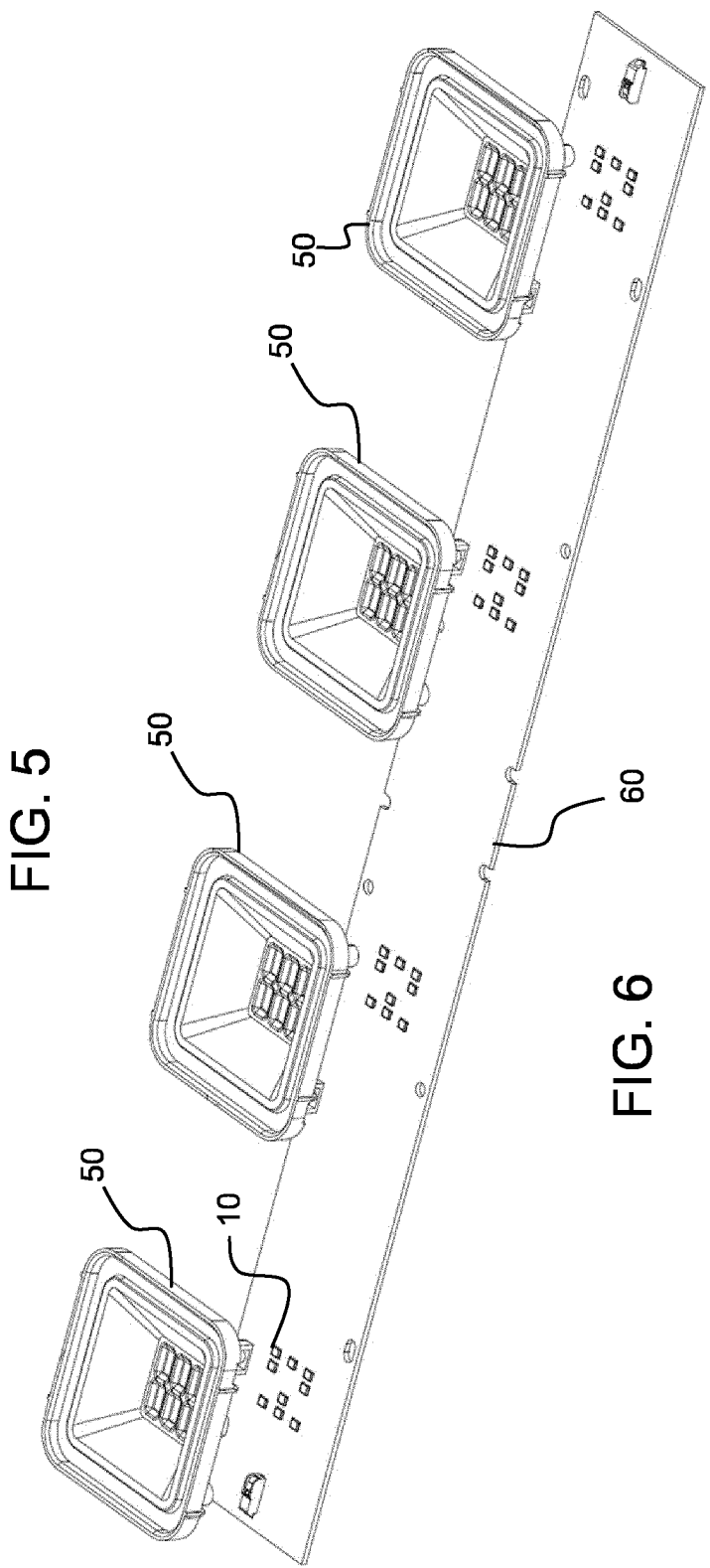

LIGHTING DEVICE HAVING GROUPS OF WHITE AND CYAN LED CHIP

CROSS-REFERENCE TO PRIOR APPLICATIONS

This application is the U.S. National Phase application under 35 U.S.C. § 371 of International Application No. PCT/EP2022/073671, filed on Aug. 25, 2022, which claims the benefit of European Patent Application No. 21198866.2, filed on Sep. 24, 2021, and International Application No. PCT/CN2021/115438, filed on Aug. 30, 2021. These applications are hereby incorporated by reference herein.

FIELD OF THE INVENTION

This invention relates to a lighting device, and in particular with multiple modules, each having a respective optical shaping unit.

BACKGROUND OF THE INVENTION

Different applications require different lumen outputs, even from a same dimension of lighting device. For example, different luminaire designs may have a same printed circuit board size and shape but require different numbers of LEDs mounted on that board area to create a different light output and/or operate with a different output power.

Despite the same board size and shape, different PCB designs are typically used in order to implement different numbers of LEDs in different product designs.

A known alternative approach, which enables a same PCB design to be used, is to make use of so-called jumpers. These are resistors (acting as short circuits) which are mounted in place of an LED to maintain circuit functionality but with a reduced number of LEDs compared to a maximum LED capacity of the PCB.

The need to manufacture multiple different PCB designs, or else the use of extra resistors (jumpers) increases the cost of manufacturing the multiple systems.

There is also an issue that when a single PCB design can be populated with different numbers of LEDs, for example by using jumpers, the quality of the optical output, for example the color uniformity over area when different color LEDs are used, will also differ between implementations with different numbers of LEDs. This is particularly the case when the PCB layout is constrained into a set of modules, each with their own beam shaping optical unit.

WO 2012/005771A2 discloses a LED array lighting component comprising a circuit board with an array of LED chips mounted on it and electrically interconnected.

US 2018/0259166A1 discloses a light source module includes: a circuit board; and a plurality of light emitting diodes arranged on the circuit board.

EP 2397749A2 discloses a light-emitting device including a series circuit, a substrate, and a sealing member.

SUMMARY OF THE INVENTION

The invention is defined by the claims.

According to examples in accordance with an aspect of the invention, there is provided a lighting device comprising:
a substrate;
at least two modules provided on the substrate, wherein each module comprises:
  an array of LED chip connection pads;
  interconnections between the chip connection pads to implement a plurality of groups of connection pads, each group comprising a plurality of connection pads in parallel, and the groups being in series with each other;
  LED chips mounted on the connection pads, with at least two LED chips of different color points mounted on respective connection pads of each group; and
  an optical unit for shaping the light output from the LED chips;
wherein each group of connection pads has a geometric center, and a sum of the distances of the connection pads in all groups to their respective geometric center is minimum, for the given placement positions of the array.

Here in the context of present disclosure, LED(s) or "light emitting diode(s)" has the same meaning as LED chip(s).

This lighting device has modules in which an array of LED chip connection pads is formed with a given placement, such as for a regular rectangular grid of LED positions.

The invention firstly relates to scalability of the module. It enables the module design to be scaled to different numbers of LED simply by not placing unwanted LEDs. Thus, the LEDs may be over every LED connection pad, or there may be vacant LED connection pads with no LED placed. The interconnections avoid the need for jumpers. In particular, the electrical circuit will still function even if LEDs from each group are omitted, because there remain LEDs in each group (in particular at least two LEDs of different color point).

The invention secondly relates to color mixing performance. By placing at least two different color points within each group, color mixing is improved, because of the minimum overall spacing between the LEDs within the groups. It also provides electrical balancing, in particular by making each group have a same or similar combination of LED types.

The different color points may be different color temperatures (e.g. warm white and cool white) or different bins for a same color, or different colors altogether.

The array of LED chip connection pads for example comprises a regular rectangular grid of chip connection pads. Thus, the color mixing is not obtained based on the LED chip positions, which remain as a regular grid, but is obtained based on the grouping of connection pads and hence LEDs.

The rectangular grid is for example a 3×4 grid (3 rows and 4 columns). In this case, the first group is a 2×2 sub-array in one corner of the grid, a third group is a 2×2 sub-array in an adjacent corner of the grid, and a second group is the remaining 4×1 sub-array. This provides the desired minimum sum of distances for a 4×3 grid divided into three sub-arrays of 4 chip connection pads. The groups are for example in series in order first to third.

In one example:
over the first, 2×2, sub-array, there are two warm white LEDs and one cyan LED;
over the second, 4×1, sub-array, there are one warm white LED and two cool white LEDs; and
over the third, 2×2, sub-array, there are two warm white LEDs, one cool white LED and one cyan LED.

The two cyan LEDs are for example at a central portion of the module. This prevents the cyan color being visible as separate spots.

The LEDs mounted on all groups may have the same set of LED color points. In this case, each group has the same overall mixed color point, with good color mixing in each group. There is then no color variation across the area of the module.

The LEDs mounted on different groups may instead include at least two different sets of LED color points. This enables greater flexibility in defining an overall output color point of the module as a whole.

There may be LEDs on each LED connection pad. Thus all LED spaces are occupied for a maximum lumen output.

Instead, within each group of LED connection pads, there may be one vacant connection pad. Alternatively, within each group of LED connection pads, there may be two vacant connection pads.

Different groups of LED connection pads may instead have different numbers of vacant connection pads. Thus, the series-parallel circuit arrangement gives flexibility to configure the modules in a variety of ways.

The at least two different color points of the LEDs mounted over each group of LED connection pads may comprise two of:
warm white;
cool white; and
cyan.

The optical unit may comprise a reflector around the outside of the array of LEDs. In one example, the reflector comprises a truncated square-based pyramid. This pyramid has a square entrance window at its base and a square light emitting window at its top. The optical unit may instead comprise a lens.

The lighting device may comprise a linear row of the modules, for example four modules.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 5 shows a strip of four modules;

FIG. 6 shows the strip of modules in exploded view;

DETAILED DESCRIPTION OF THE EMBODIMENTS

Figure 1:
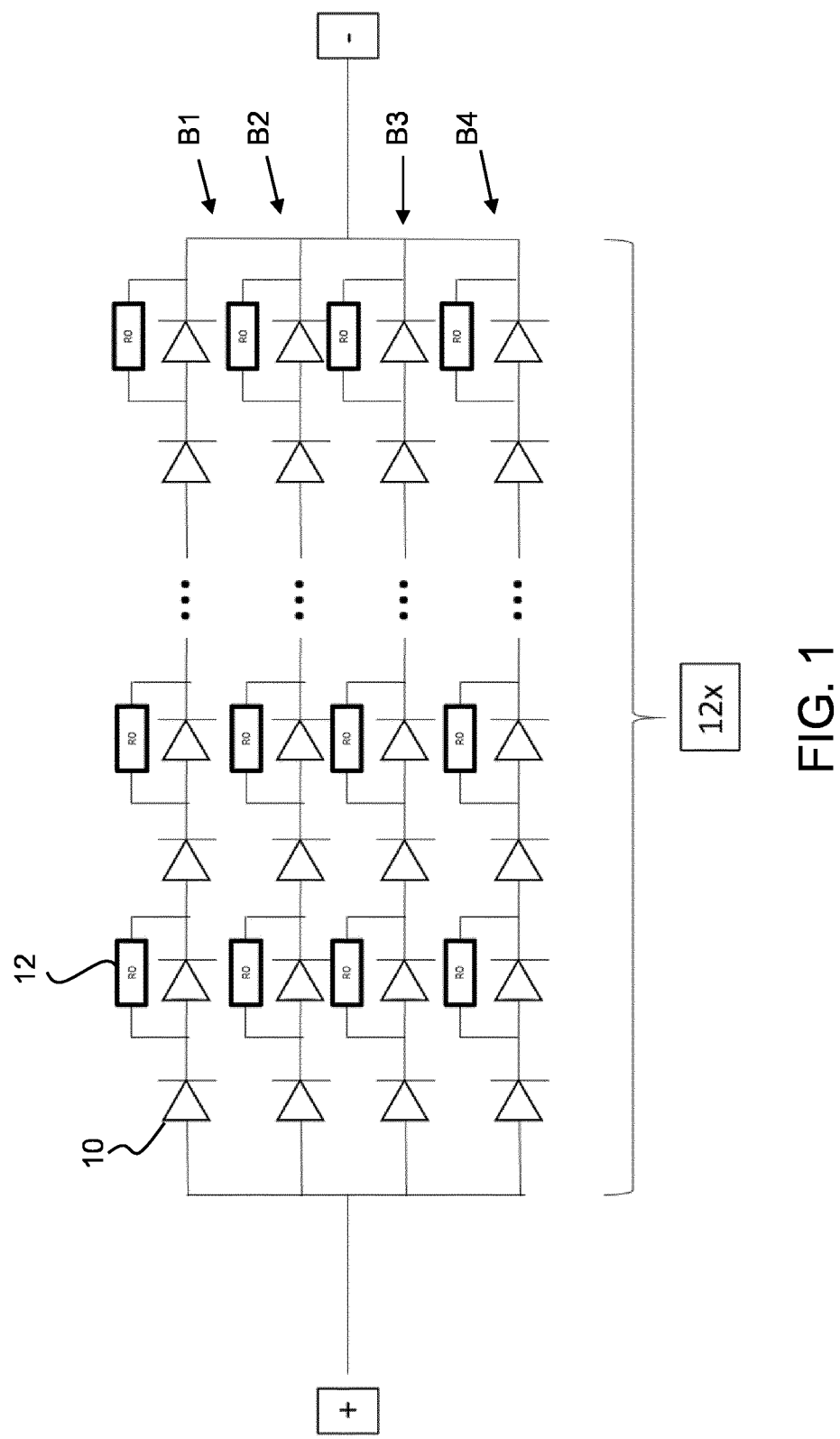
FIG. 1 shows a known layout for a LED circuit which can be configured as 36 LEDs or 48 LEDs.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting device which comprises multiple modules each having an array of LED chip connection pads. Interconnections between the connection pads provide groups of connection pads, each group comprising a parallel set of connection pads, and the groups being in series with each other. An optical unit is provided for shaping the light output from LED chips mounted on the pads. The groups are defined to minimize an overall spacing of the pads within the groups (in combination) to provide a best possible color mixing for the LEDs mounted on the connection pads.

FIG. 1 shows a known layout for a LED circuit which can be configured as 36 LEDs or 48 LEDs.

The circuit comprises four branches B1 to B4 in parallel, Each branch comprises a string of 12 LEDs 10 in series.

Along each branch, three of the LEDs have a space for connection of parallel jumpers 12. By placing those parallel jumpers, the LEDs are bypassed. The LEDs may be in place but bypassed (and the voltage drop across the jumper is below the forward LED voltage). Thus, a standard 48 LED PCB can be reconfigured as a 36 LED device by adding the three jumpers per branch. The LEDs to be bypassed may instead be omitted to reduce cost.

The circuit can thus be switched between 48 LEDs (four branches of 12) and 36 LEDs (four branches of nine), or indeed other configurations by bypassing a different number of LEDs.

Figure 2:
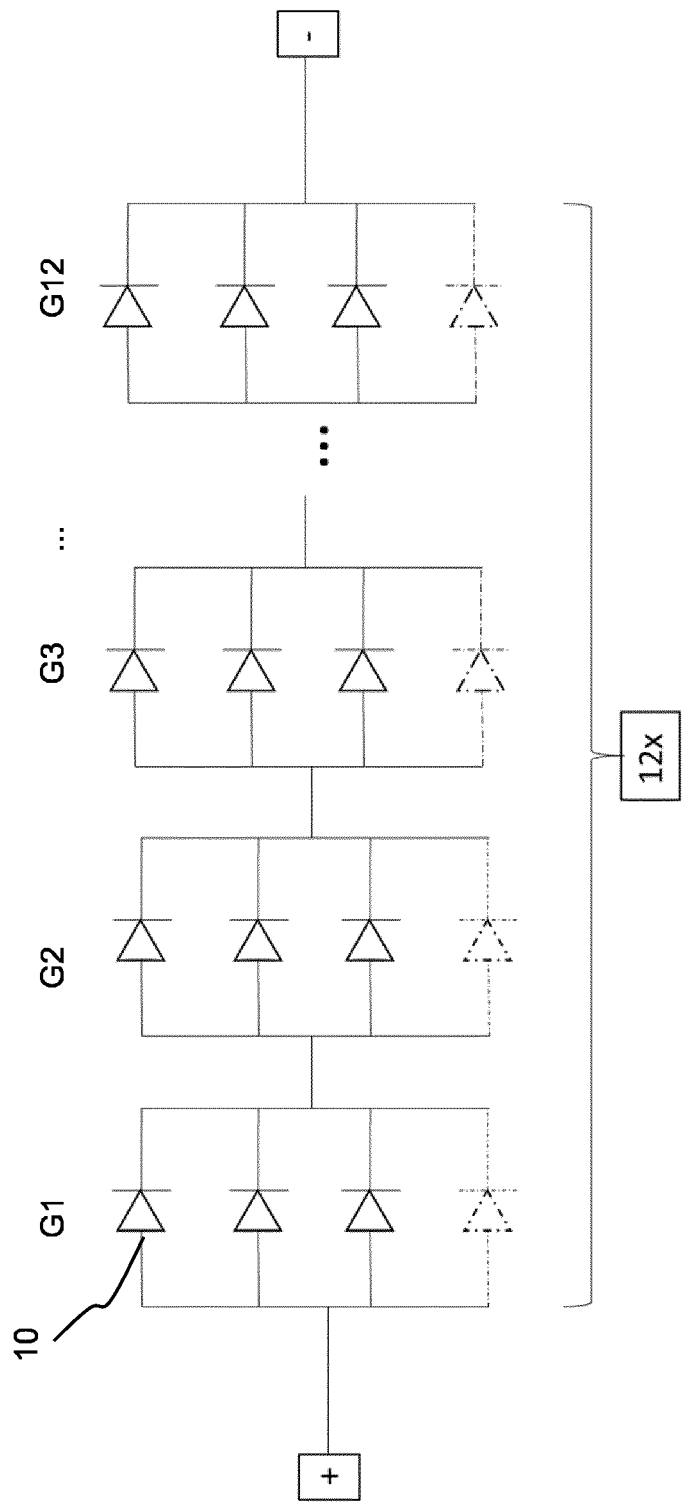
FIG. 2 shows an example of a LED circuit using a first design aspect in accordance with the invention.

FIG. 2 shows an example of a LED circuit using a first design aspect in accordance with the invention, The circuit comprises 12 groups G1 to G12 of LEDs, and each group comprises a plurality of LEDs 10 in parallel. In this example each group has four LEDs in parallel.

This makes the circuit scalable. For example, by simply omitting on LED from each group, and without needing any jumpers, the circuit can be scaled from 48 LEDs (12 groups of four LEDs) to 36 LEDs (12 groups of three LEDs).

Thus, the circuit can be scaled to different numbers of LEDs simply by not placing unwanted LEDs.

The LEDs are mounted at connection pads, and the connection pads define the series and parallel arrangement as shown. By connecting LEDs over every LED connection pad the full LED capacity is reached. However, by leaving vacant LED connection pads, a reduced LED count is achieved. The electrical circuit still functions even if one or more (but not all) LEDs from each group are omitted.

The invention relates in particular to a lighting device comprising a line of modules or multiple lines of modules forming a 2D array, wherein the modules in combination provide the set of LEDs such as the 48 LEDs or 36 LEDs in the example shown above.

For example, each module may comprise at most 12 LEDs and there are four such modules to create the maximum 48 LED capacity.

The lighting device has spaced apart modules distributed over an area (a line or a 2D array). The modules in combination provide the desired lumen output and the use of spaced modules achieves the desired unified glare rating (UGR), for example for office lighting.

As discussed below and as shown in FIGS. 5 and 6, each module has an optical element, such as a concave reflector, and the LEDs of the module are in the reflector cavity.

Further details relating to this particular type of lighting device can be found in EP 2 792 936.

Each module has its own series-parallel arrangement such as shown in FIG. 2, but in this example with only 12 LEDs per module. The 12 LEDs are arranged as three groups, each with four LEDs in parallel, and the three groups are in series with each other. Thus, when all four modules are arranged in series, there are 12 parallel groups of LEDs, with all 12 groups in series with each other, and hence the overall circuit of FIG. 2 is formed.

Each module has an array of LED chip connection pads to which LEDs may or may not be connected. The interconnections between the chip connection pads implement the plurality of groups (G1 to G12) of parallel connection pads. The connection pads are formed as a regular rectangular grid, in particular a 3×4 grid in this example.

Figure 3:
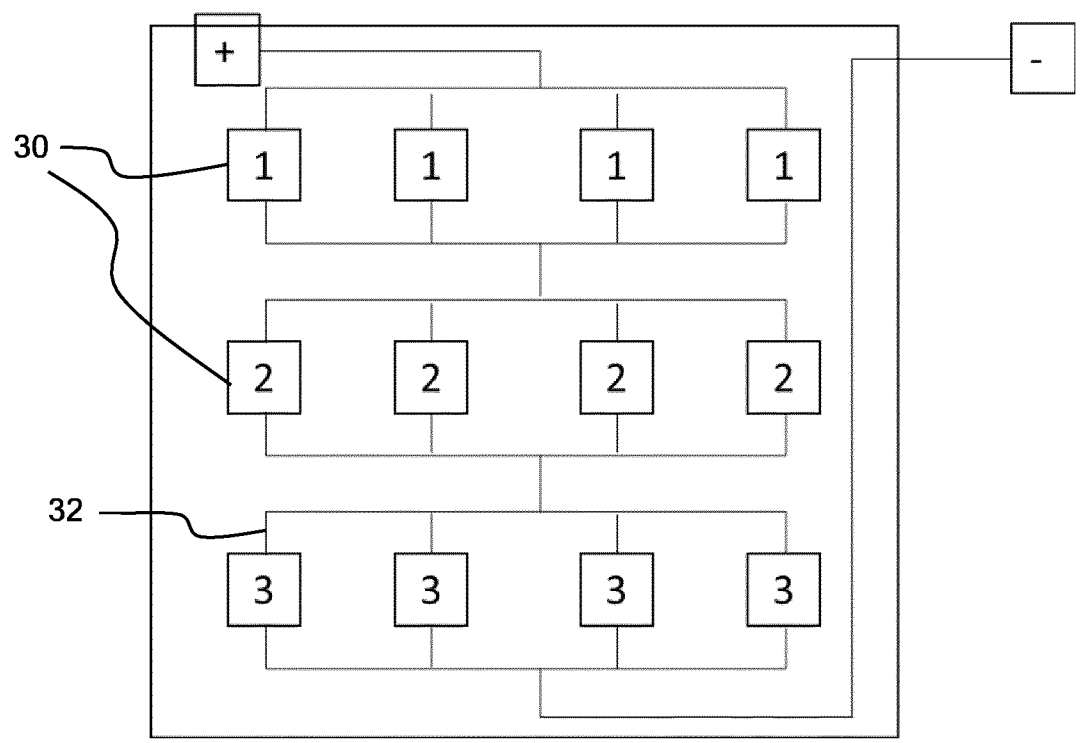
FIG. 3 shows one possible way to interconnect the 12 LED connection pads of a module.

FIG. 3 shows one possible way to interconnect the 12 LED connection pads 30. Each of the three rows of connection pads 30 forms one of the groups. The interconnections 32 between the pads provide the connection pads of each group in parallel and the groups in series with each other.

Another aspect of the invention is to provide an improved layout of the LED connection pads.

Figure 4:
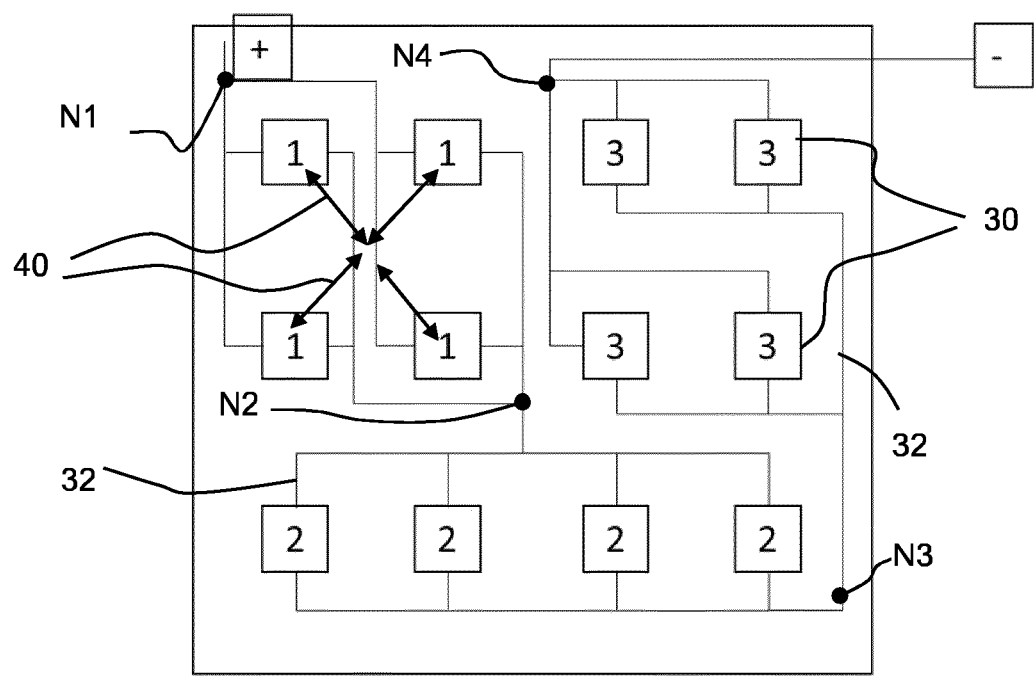
FIG. 4 shows an improved way to interconnect the connection pads.

FIG. 4 shows the connection pad layout for this 3×4 grid.

In this case, a first group of connection pads 30 is a 2×2 sub-array in one corner of the 3×4 grid. This first group is labelled 1 in FIG. 4 and is in the top left corner. The interconnections 32 place all of these connection pads in parallel, between node N1 and node N2. The second group of connection pads 30 is labelled 2 in FIG. 4 and is a 1×4 sub-array forming the bottom row. The interconnections 32 place all of these connection pads in parallel, between node N2 and node N3. The third group of connection pads 30 is labelled 3 in FIG. 4 and is a 2×2 sub-array in the top right corner. The interconnections 32 place all of these connection pads in parallel, between node N3 and node N4.

It can be seen that this interconnection arrangement does not require any crossovers and can thus be formed as a conductor single layer of the PCB.

Each connection pad is shown as a single square in FIGS. 3 and 4. In fact, each connection pad comprises a pair of contacts, for connection to the LED anode and LED cathode.

Within each group, there is a geometric center, which is the geometric average of the locations of the centers of the connection pad areas. Each group has a sum of the distances between those centers and the geometric center. For the first group, the arrows 40 represent these distances. For the 2×2 sub-arrays, this sum of distances is as small as it can be (there is no group of four connection pads with lower distance sum), whereas for the 1×4 sub-array, the sum of distances is larger. However, to total sum (for all groups) is a minimum, for the given placement positions of the array (i.e. the regular rectangular 3×4 grid in this example).

This distance minimization is used to provide the best possible color mixing for LEDs of different color point. The different color points may be because different LEDs are from different bins (so they have different color points although they are designed to output the same color point), or because the LEDs have different color temperature (e.g. warm white vs. cool white) or because the LEDs have different colors (e.g. white (cool or warm) vs. cyan).

To take advantage of the color mixing advantage, there are at least two LEDs of different color points mounted on the connection pads of each group. Thus, each group performs color mixing between different color points, rather than allocating individual color points to each group.

Furthermore, by providing different LED types in each group, rather than having each group devoted to a particular LED color point and hence type, improved electrical balancing is obtained.

The overall lighting device is formed by multiple modules, such as the module of FIG. 4. Each module has its own an optical unit for shaping the light output from the LED chips of the group.

FIG. 5 shows the strip of four modules M1 to M4. Each module has an optical unit 50 in the form of a tapered reflector. The reflector comprises a square or rectangular based truncated pyramid. Thus, there is a square or rectangular light receiving opening around the module at the PCB level, and a larger square or rectangular light exit open raised above the LED surface. The inner wall around the module is reflective. There may also be lenses over individual LEDs or small sub-groups of LEDs. For example, two pairs 52 of LED connection pads (and hence one pair of LEDs if connected) may have a shared lens.

FIG. 6 shows the strip of modules in exploded view. It shows the PCB 60 on which the LEDs 10 are mounted. The LED 60 is shared between the modules.

In this example, each group of connection pads has one vacant space and LEDs 10 are place over the other three connection pads of each group. There may be two vacant connection pads in each group, or more in the case of a larger group. There remain at least two connected LEDs per group to take advantage of the color mixing advantages of the geometric layout.

In other examples, different groups of LED connection pads may have different numbers of vacant connection pads (such as the example of FIG. 8 described below).

The basic design may be to include vacant connection pads, for example to create the 36 LED device of FIG. 6. The design is then upgradable to a 48 LED design without creating a new PCB.

The upgrade can be carried out with the same reflector design and using the same driver voltage window, since there is the same number of groups in series and hence the same combination of LED forward voltages.

Figure 7:
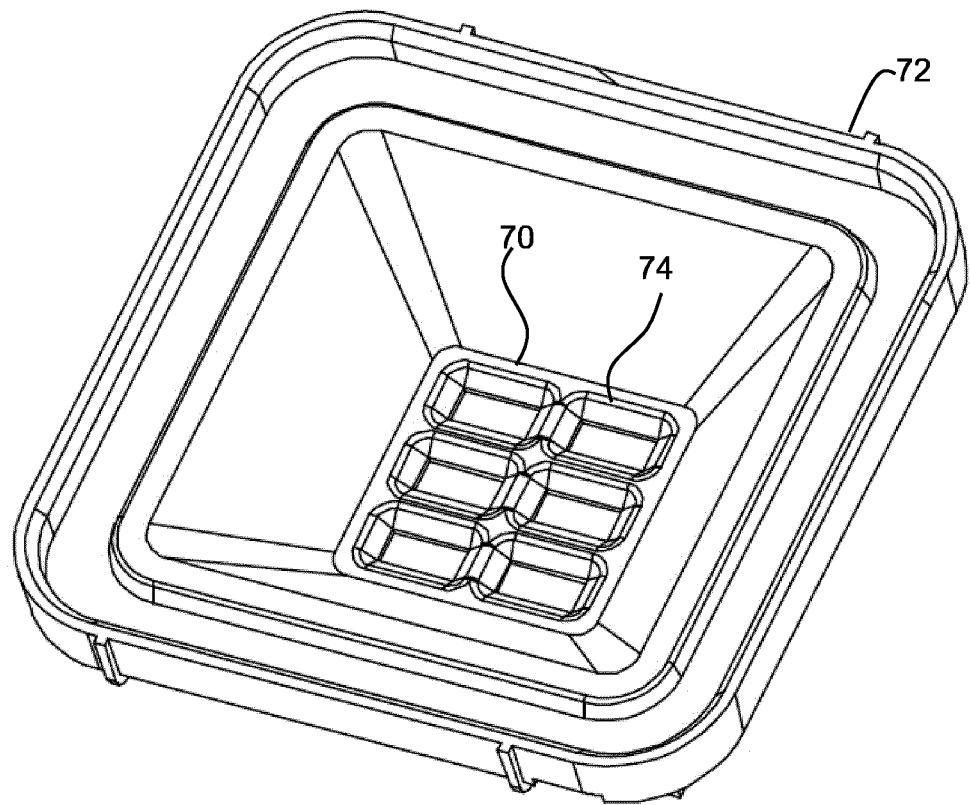
FIG. 7 shows one of the reflector in more detail.

FIG. 7 shows one of the reflectors in more detail, and shows the light entrance window 70 of the pyramid shape and the light exit window 72. The light entrance window 70 is formed with an array of openings 74. Each opening 74 contains two pairs of connection pads, so that at most two LED chips are mounted at each opening. As mentioned above, lenses may optionally be formed at the light entrance window.

Figure 8:
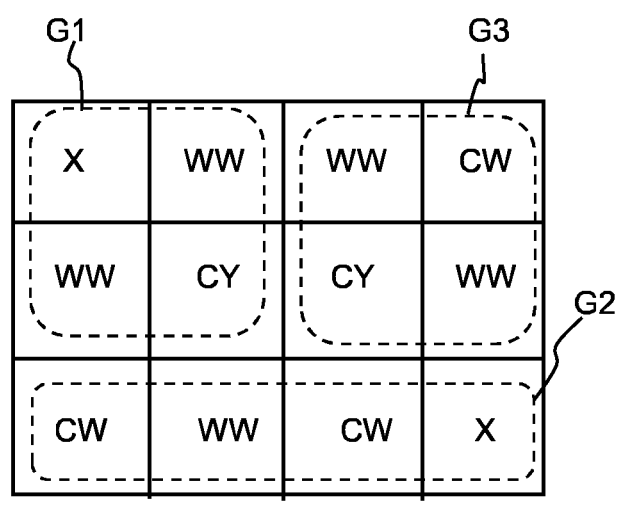
FIG. 8 shows one possible combination of color points.

FIG. 8 shows one possible combination of color points for one module (and which may be repeated in each module).

The 2×2 sub-array of the first group G1 comprises two warm white (WW) LEDs and one cyan (CY) LED. One space is vacant (X). The 1×4 sub-array of the second group G2 comprises two cool white (CW) LEDs and one warm white LED. One space is vacant. The 2×2 sub-array of the third group G3 comprises two warm white LEDs, one cool white LED and one cyan LED. There is no vacant space.

The two cyan LEDs are side-by-side in the middle of the module. This reduces the spottiness of the cyan LEDs, as they have a larger contrast against the white LEDs and are hence located adjacent each other. This is a tunable white, cyan enhanced, configuration.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting device comprising:
   a substrate;
   at least two modules provided on the substrate, wherein each module comprises:
      an array of LED chip connection pads;
      interconnections between the chip connection pads to implement a plurality of groups of connection pads, each group comprising a plurality of connection pads in parallel, and the groups being in series with each other;
      LED chips mounted on the connection pads, with at least two LED chips of different color points mounted on respective connection pads of each group;
      an optical unit for shaping the light output from the LED chips; and
      wherein the array of LED chip connection pads comprises a rectangular grid of chip connection pads, wherein the rectangular grid is a 3×4 grid;
      wherein a first group is a 2×2 sub-array in one corner of the grid, a third group is a 2×2 sub-array in an adjacent corner of the grid, and a second group is the remaining 4×1 sub-array;
      wherein over the first, 2×2, sub-array, there are two warm white LED chips and one cyan LED chip;
      over the second, 4×1, sub-array, there are one warm white LED chip and two cool white LED chips; and
      over the third, 2×2, sub-array, there are two warm white LED chips, one cool white LED chip and one cyan LED chip.

2. The lighting device of claim 1, wherein the two cyan LED chips are at a central portion of the module.

3. The lighting device of claim 1, wherein the LED chips mounted on different groups include at least two different sets of LED color points.

4. The lighting device of claim 1, comprising a linear row of the modules.

5. The lighting device of claim 4 comprising four modules.

6. The lighting device of claim 1, wherein the optical unit comprises a reflector around the outside of the array of LED chips.

7. The lighting device of claim 6, wherein the reflector comprises a truncated square or rectangular based pyramid shape.

8. The lighting device of claim 6, wherein the optical unit comprises a lens.

9. A lighting device comprising:
   a substrate;
   at least two modules provided on the substrate, wherein each module comprises:
      an array of LED chip connection pads;
      interconnections between the chip connection pads to implement a plurality of groups of connection pads, each group comprising a plurality of connection pads in parallel, and the groups being in series with each other;
      LED chips mounted on the connection pads, with at least two LED chips of different color points mounted on respective connection pads of each group;
      an optical unit for shaping the light output from the LED chips;
      an optical unit for shaping the light output from the LED chips; wherein:
   there are LED chips on each LED connection pad; or
   within each group of LED connection pads, there is one vacant connection pad; or
   within each group of LED connection pads, there are two vacant connection pads; or
   different groups of LED connection pads have different numbers of vacant connection pads.

10. A lighting device comprising:
    a substrate;
    at least two modules provided on the substrate, wherein each module comprises:
       an array of LED chip connection pads;
       interconnections between the chip connection pads to implement a plurality of groups of connection pads, each group comprising a plurality of connection pads in parallel, and the groups being in series with each other;
       LED chips mounted on the connection pads, with at least two LED chips of different color points mounted on respective connection pads of each group;
       an optical unit for shaping the light output from the LED chips;
       an optical unit for shaping the light output from the LED chips;
       wherein the LED chips mounted on all groups have the same set of LED color points; and
       wherein the at least two different color points of the LED chips mounted over each group of LED connection pads comprise two of:
    warm white;
    cool white; and
    cyan.

* * * * *